June 4, 1963 R. H. FISH 3,092,327
ORCHARD SPRAY MECHANISM
Filed Dec. 3, 1962 2 Sheets-Sheet 1
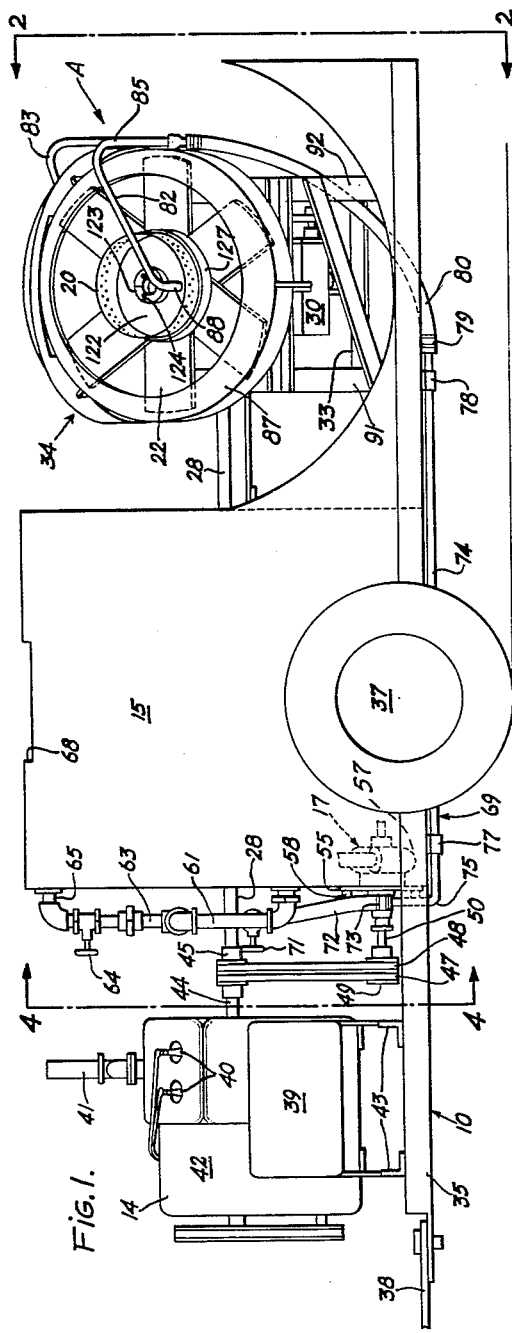
INVENTOR.
RICHARD H. FISH
BY
HIS ATTORNEYS

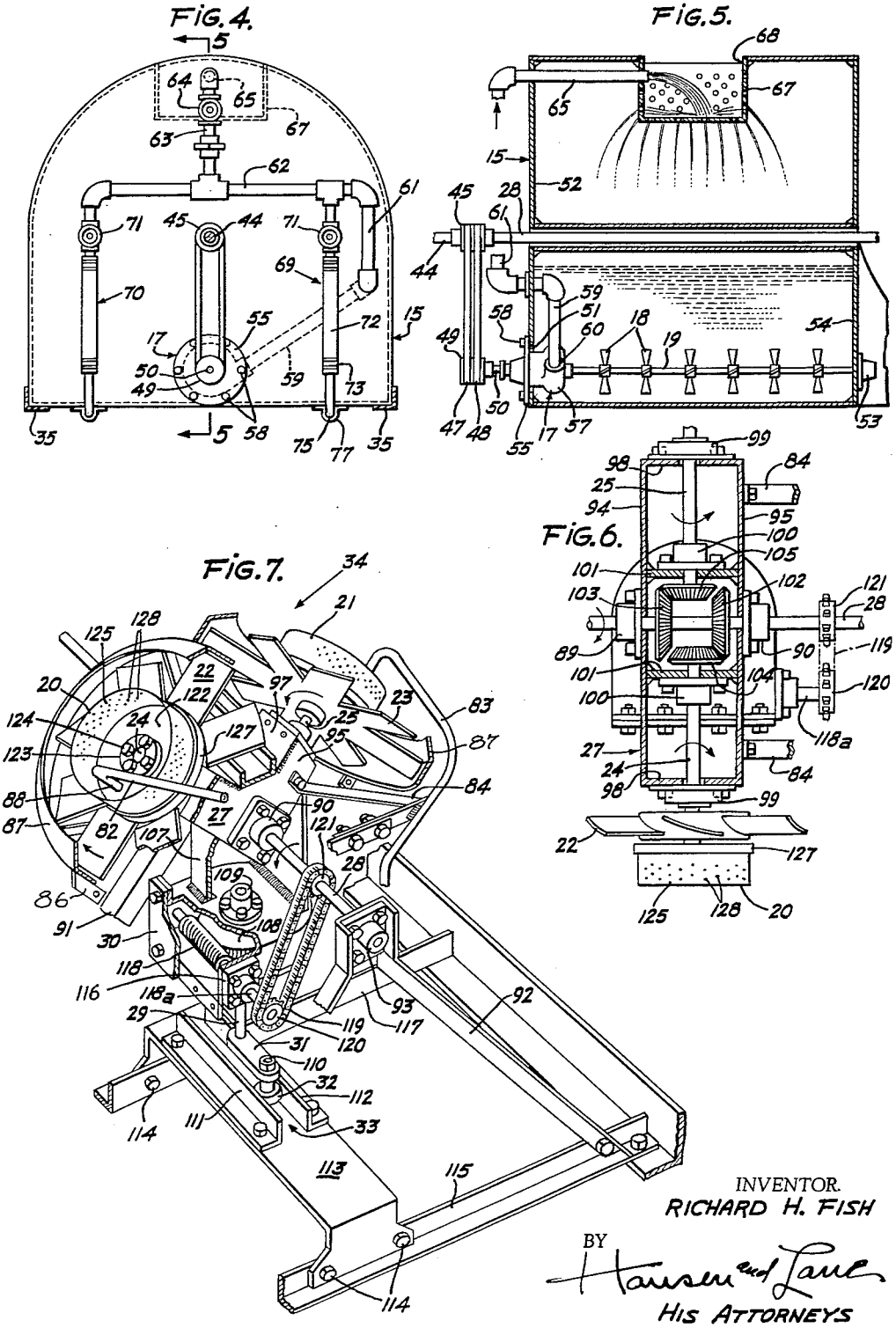

United States Patent Office 3,092,327
Patented June 4, 1963

3,092,327
ORCHARD SPRAY MECHANISM
Richard H. Fish, Morgan Hill, Calif., assignor of one-half to Evalyn Preston, Morgan Hill, Calif.
Filed Dec. 3, 1962, Ser. No. 241,754
8 Claims. (Cl. 239—77)

This invention relates to an insecticide spraying mechanism, and pertains more particularly to an orchard spraying mechanism wherein liquid insecticide is fed, in a large, low pressure stream, into a perforated bowl mounted co-axially of a shrouded, axial flow fan for rotation therewith, and the fan is oscillated back and forth transversely of the direction of travel of a vehicle upon which it is mounted.

In the past, various types of orchard spray mechanisms have been devised employing one or more axial flow fans, each discharging an air blast angularly upwardly and outwardly from the mechanism, while high pressure spray nozzles discharged droplets of liquid insecticide into such air blasts. Since such liquid insecticide usually contain at least some solid particles, these nozzles were sometimes subject to clogging.

The present invention provides axial flow fan means for discharging a high velocity air blast upwardly and outwardly for dissemination through the foliage of orchard trees and includes means for feeding liquid insecticide in a low presure stream into a perforated, bowl-like member provided axially of each fan for dissemination in droplet form through the perforations of the such bowl-like member and into the air stream created by the fan means.

Another object of the invention is to provide an improved, orchard spray mechanism comprising a pair of axial flow fans mounted on a transverse rocker mechanism whereby the axis of rotation of each fan is so directed as to sweep a desired vertical angle upon actuation of the rocker mechanism, means being also provided for feeding a low pressure stream of insecticide into a perforated, bowl-like portion mounted co-axially of each of the fans for rotation therewith.

A further object of the invention is to provide an improved and simplified orchard spray mechanism.

These, and other objects and advantages of the invention, will be apparent from the following description and the accompany drawings, wherein:

FIG. 1 is a side elevational view of a trailer mounted orchard spray mechanism embodying the present invention.

FIG. 2 is a rear end view looking in the direction of the arrows 2—2 of FIG. 1, the twin fan assembly being tilted to its left hand limit of movement.

FIG. 3 is a view similar to FIG. 2 but omitting the support wheels, and with the twin fan assembly tilted to its right hand limit of movement.

FIG. 4 is a sectional view taken along line 4—4 of FIG. 1.

FIG. 5 is a fragmentary, vertical, longitudinal, sectional view through the central, or tank, portion of the mechanism shown in FIGS. 1–4.

FIG. 6 is an enlarged, fragmentary, developed, sectional view of the fan drive gear box mechanism taken along line 6—6 of FIG. 2.

FIG. 7 is a fragmentary, perspective view showing the fans, gear box, and oscillating mechanism, portions being broken away.

Briefly, the illustrated embodiment A of the invention comprises a trailer 10, with a conventional internal combustion engine 14 mounted on its forward end to provide the power required for driving the various parts of the mechanism.

An insecticide tank 15 is provided medially of the length of the trailer 10, and a centrifugal pump 17, mounted in the lower portion of the tank 15, and having liquid agitating impellers 18 secured to an extension 19 of the pump rotor shaft, draws liquid insecticide from the tank and discharges it, at controlled, low pressure, into a pair of perforated, bowl-like members 20 and 21, mounted co-axially of a pair of shrouded, axial flow fans 22 and 22 respectively.

Upon rotation of the fans 22 and 23 at high speed, the insecticide liquid discharged into the bowl-like members 20 and 21 is driven by centrifugal force outwardly through the perforations in the walls thereof in the form of spray droplets. These droplets are entrained in the enveloping air blasts from the respective fans 22 and 23 in the form of fog-like spray, which is carried outwardly by the air blasts for deposit upon the foliage and branches of adjacent trees.

The fans 22 and 23 are mounted on angularly divergent shafts 24 and 25 in a common gear box 27, which in turn is journaled for transverse rocking movement on a fan drive shaft 28 from the engine 14. A slowly rotating shaft 29, extending downwardly from the lower end of a lower, worm gear box 30, has an arm 31 secured to its lower end. This arm is provided with a roller 32 on its outer end, which rides in a fixed channel 33 to rock the fan assembly 34, consisting of the gear box 27, and its associated parts, back and forth in recurring cycles between the positions thereof shown in FIGS. 2 and 3.

Referring to the drawings in greater detail, the trailer 10, upon which the spray mechanism of the present invention is mounted, is of a conventional type, with a flat bed 35 made of structural steel shapes welded together in a usual manner, and having a pair of support wheels 37 journaled thereon. The support wheels 37 are of the pneumatic tired, automobile type, and a conventional trailer hitch 38 is mounted on the forward end of the trailer bed 35 for hitching the trailer to a suitable towing vehicle, such as a farm tractor (not shown). The engine 14, which drives the fans 22 and 23 and their associated mechanism, is of a conventional, air cooled, internal combustion type, with fuel tank 39, spark plugs 40, exhaust stack 41, and air blower shroud 42. The engine 14 is mounted on engine bearers 43 secured to the trailer bed.

The engine drive shaft 44 is connected co-axially to the fan drive shaft 28 by a double grooved coupling pulley 45. A pair of V-belts 47 and 48 are passed around the grooves of this coupling pulley 45, and also around a double pulley 49 on the shaft 50 (FIGS. 1 and 4) of the insecticide pump 17.

The latter, as best shown in FIGS. 4 and 5, is of a conventional centrifugal type, and is mounted in a hole 51 (FIG. 5) provided therefor in the forward end wall 52 of the tank 15. The impeller shaft extension 19 which is coupled co-axially at its forward end to the pump shaft 50, is journaled at its rear end in a bearing 53 mounted on the rear tank wall 54. The impellers 18 are mounted at required spaced intervals on the pump shaft extension 19 to agitate liquid in the tank 15 and maintain any solid particles therein in suspension.

A mounting flange 55 is formed integrally with the pump housing 57, and is secured by screws 58 in liquid sealing relation to the tank end wall 52 surrounding the pump opening 51 therein. The pump 17 draws liquid from the tank 15 inwardly through a usual opening (not shown) on the inner, or right hand, end of the pump housing 57 as shown in FIG. 5, and discharges the liquid substantially tangentially of the housing into a pipe 59 connected to the discharge outlet 60 of the pump. Thence the liquid is carried upwardly through a pipe 61 and conventional pipe fittings to a transverse header pipe 62. From a central portion of the header pipe 62 a return bypass pipe 63 is connected, through a manual control valve 64, and a pipe 65 to discharge into a perforated strainer 67 provided in the upper end of the tank 15. A larger filler opening 68 is provided in the top of the tank above the strainer 67 as shown in FIG. 5 for filling the tank.

A pair of liquid supply lines 69 and 70 are connected to the header 62 adjacent opposite ends thereof. Since these supply lines are substantially identical, only the left hand line 69 will be described in detail herein. The liquid supply line 69 has a manual control valve 71 therein to control the flow of liquid therethrough. A length 72 (FIGS. 1 and 4) of flexible hose material is connected to the outlet side of the control valve 71, and thence extends downwardly and is connected at 73 to a rigid pipe 74, which is bent at 75 to extend rearwardly beneath the tank 15 and the fan assembly 34, to which it is secured by clips 77 and 78. At its rear end the pipe 74 is connected at 79 to a second length 80 of flexible hose material.

The upper end of this second, or rear length 80 of flexible hose material is connected at 81 to the lower end of a left hand, bent, rigid, pipe member 82 which, with its companion right hand bent pipe member 83, is secured to a bracket 84 rigidly mounted on the rear side of the fan drive gear box 27. The pipe member 82 is bent, as shown in FIGS. 1–3 and 7, so that it extends upwardly at 85, around a fan shroud 87, and thence forwardly over the left hand, perforated, bowl-like member 20. The forward or discharge end portion 88 of this left hand bent pipe member 82 is directed downwardly as shown in FIGS. 1–3 and 7 to discharge into its perforated bowl-like member 20.

Since the bracket 84 upon which the two rigid, bent discharge pipes 82 and 83 are secured, is, in turn, fixedly secured to the oscillating gear box 27, these pipes 82 and 83 retain their same positions relative to their respective perforated bowl-like members 20 and 21 during lateral oscillation of the fan assembly 34.

Referring now to the fan assembly 34, the fan drive gear box 27 has journal support on the fan drive shaft 28 in a pair of bearings 89 and 90 (one or more of which is shown in FIGS. 6 and 7) provided one on each end of the gear box 27. The portion of the fan drive shaft 28 upon which the gear box 27 is mounted is further supported by two A-frames 91 and 92 of structural steel members. These A-frames are fixedly secured to the trailer bed 35, and are provided with conventional bearings 93 (FIG. 7) on their upper ends. The A-frames 91 and 92 are mounted with their bearings 93 co-axial with each other and with the engine drive shaft 44, and the fan drive shaft 28 is journaled in these A-frame bearings.

The illustrated fan drive gear box 27 comprises two similar, substantially L-shaped, front and rear metal plates 94 and 95 (FIG. 6) mounted in parallel, spaced, opposite relation, and with a top plate 97 (FIG. 7) sealed as by welding to their upper edges. End plates 98 are provided, one on the outer end of each leg of the gear box, and a fan shaft bearing 99 is mounted on each of the end plates. A second, or inner, fan shaft bearing 100 is also mounted on a transverse plate 101 at the inner end of each gear box leg. The fan shafts 24 and 25 are journaled in these bearings, and diverge at an angle of approximately 90° to each other. The fans 22 and 23 are secured in a conventional manner on the outer ends of their respective shafts, and are surrounded by conventional, identical shrouds 87 fixedly secured to the gear box 27 by brackets 86 (FIGS. 2 and 3).

A pair of similar bevel drive gears 102 and 103 (FIG. 6) are secured, in axially spaced relation, on the fan drive shaft 28 within the gear box 27. The beveled sides of these gears 102 and 103 face inwardly toward each other. A driven bevel gear 104, of slightly smaller diameter than the spacing between the bevel drive gears 102 and 103, is fixedly mounted on the inner end of the left hand fan shaft 24, and is in mesh with the rear bevel drive gear 102, thus being out of mesh with the other drive gear 103. A similar driven gear 105 is similarly mounted on the other fan shaft 25, and is in mesh with the forward bevel drive gear 103. The axis of the fan shaft 25 upon which the bevel gear 105 is mounted is necessarily slightly ahead of that of the other fan shaft 24 in order that the two driven gears 104 and 105 will mesh with their respective drive gears 102 and 103.

Upon rotation of the fan drive shaft 28, the two fan shafts 24 and 25 will thus be rotatively driven in opposite directions, but since they are directed toward opposite sides of the trailer, their upper sides will both travel in the same direction relative to a forward movement of the trailer 10, as indicated by the curved arrows associated with each of these shafts in FIG. 6. This is desirable, since it tends to provide uniform spray patterns on both sides of the trailer.

For resisting the torque of the fan drive shaft 28, which would tend to rotate the gear box 27 thereon, and for providing the desired lateral, oscillative movement of the fan assembly 34 on the fan drive shaft 28, a bracket 107 is secured to extend downwardly from the under side of the gear box 27, as best shown in FIG. 7. On the lower end of this bracket 107 is mounted a worm gear housing 30, and a worm gear 108 (FIG. 7) in this gear housing is secured to the shaft 29, which is journaled in a pair of bearings 109 secured to the top and bottom, respectively, of this gear housing.

The roller arm 31 is secured to extend radially from the lower end of the worm gear shaft 29, and the roller 32, which may be, for example, a conventional ball bearing, is secured by a bolt 110 to this arm 31 at a desired distance from the worm gear shaft 29. The channel 33 for retaining the roller 32 against lateral displacement during rotation of the arm 31 comprises a pair of angle irons 111 and 112, secured in parallel, spaced relation to a bridge 113 of suitable metal plate. The bridge 113 is secured by bolts 114 to a pair of angle iron frame members 115 and 117, which also form the bases of the A-frames 91 and 92. The roller guide channel 33 is of a width to receive the roller 32 for rolling movement therein, and of sufficient length, and so mounted, as to prevent the roller from passing beyond the ends thereof during rotation of the arm 31.

The worm gear 108 is rotatably driven by a worm pinion 118, mounted on a shaft 118a journaled in bearings 119 (FIG. 7) in the worm gear housing 30. The worm pinion 108 in turn is driven by a conventional drive chain 119, passing around a first sprocket 120 on the worm pinion shaft 118a and a second sprocket 121 on the fan drive shaft 28. Upon such rotation of the worm gear 108 and its shaft 29, the roller arm 31 rotates therewith.

As the roller arm 31 swings to the left of the shaft 29, the fan assembly 34 is tilted thereby to the left about the drive shaft 28 as a pivot. During such leftward tilting of the fan assembly 34, although the lower end of the worm gear shaft 29 is raised slightly, as is apparent in FIG. 2, the arm 31 is also tilted downward slightly, so that the roller 32 maintains substantially its same height within the channel 33. A similar, but reverse, tilting action occurs when the roller arm 31 is swung to the right of its shaft, as shown in FIG. 3.

Thus, as the fans 22 and 23 are driven rotatively on their respective shafts 24 and 25 by the rotation of the fan drive shaft 28, the entire fan assembly 34 is oscillated from right to left in recurring cycles between the positions thereof shown in FIGS. 2 and 3. This oscillation occurs at a speed relative to that of the fan drive shaft 28 as determined by the gear ratio of the sprockets 120 and 121, and of the worm gear 108 and its drive pinion 118.

The two bowl-like members 20 and 21 are identical to each other, and the left hand one 20 only will be described in detail herein. The bowl-like member 20 comprises a circular, flanged bottom plate 122, secured co-axially to its fan 22 by a mounting disc 123 (FIGS. 1 and 7) and screws 124. A perforated, cylindrical wall 125, of suitable material such as sheet metal, is secured in sealed relation to a marginal flange 127 formed around the bottom plate 122, and has a required number of perforations 128 of required size therein.

Preferably, an unperforated portion is provided at the lower end of each wall 125 to allow the liquid in the bowl to spread into a thin sheet thereof before reaching the perforations. This prevents the liquid from developing a pressure head and tends to keep the droplets of proper size and to distribute them uniformly into the air blast. Variation in the size and number of these perforations will obviously vary the size and number of droplets discharged through the rotating, perforated wall 125. Since the bowl-like members 20 and 21 are removable from their respective fans by removing the mounting screws 124 which secure them in place, suitably perforated bowl-like members may be provided to meet the requirements of any selected spraying liquid, and existing orchard and weather conditions.

In operating the illustrated form of the invention, the trailer 10 is coupled by the hitch 38 to a suitable, power-driven towing vehicle (not shown). With suitably perforated bowl-like members 20 and 21 installed on each of the fans 22 and 23, the tank 15 is filled through the filler opening 68 with a required volume of a desired type of insecticide liquid.

With the by-pass valve 64 open, and the control valves 71 to the fan supply lines 69 and 70, closed, the engine 14 is started, and preferably is operated for at least a short time in advance of a spraying operation so that the impellers 18 on the pump shaft extension 19 will agitate the liquid in the tank 15 and keep any finely divided, solid particles in suspension therein. Operation of the engine 14 also drives the fans 22 and 23, but since, as specified previously herein, the control valves 71 are closed, no liquid reaches the fans.

The trailer 10 is then towed to a desired starting position between selected rows of trees in an orchard which is to be sprayed, and, as the trailer starts its spraying run, the valves 71 are opened, and the by-pass valve 64 may also be partly closed to discharge a desired volume of liquid through the lines 69 and 70 into the perforated bowl-like members 20 and 21. The required adjustment of these valves can be arrived at quickly and easily by one familiar with the operation of the mechanism by visual observation.

The fans 22 and 23 are driven at high speed by the engine 14 to produce powerful, diverging blasts of air substantially co-axial with the fan shafts 24 and 25, respectively. As the liquid is discharged from each of the liquid supply lines 69 and 70 into their respective perforated bowl-like members 20 and 21, the liquid is whirled around within the rotating bowl-like members forming a thin film thereof on the unperforated lower wall portions 125, and, as it reaches the perforations, is discharged by centrifugal force through the perforations 128 in the wall 125 of each bowl-like member in the form of droplets into the enveloping air blasts from their respective fans. Here the droplets, in the form of spray, are entrained in the air blasts and carried outwardly into the foliage and onto the branches and trunks of the trees on each side of the trailer. As the latter is towed along between the rows of trees, the rotation of the fan drive shaft 28, transmitted through the drive chain 119, drives the worm pinion 118, and thereby the worm gear 108. The latter rotates the roller arm 31 and oscillates the fan assembly 34 back and forth in recurring cycles between the positions thereof shown in FIGS. 2 and 3.

The transversely oscillating, angularly diverging, swirling, air blasts from the oscillating fan assembly alternately produce vapor laden, swirling air blasts within limited zones of the foliage of the trees on each side of the trailer's path as the air blast from each fan is directed into such zone, followed by a period of calm as the blast is tilted to pass beyond such zone. This calm is again followed by another air blast before the vehicle has passed. This pulsating, swirling, spraying action has been found to produce a very satisfactory wetting of both sides of the foliage and branches of trees by a spraying mechanism embodying the present invention.

The invention provides a simple, relatively inexpensive, and very effective, orchard spraying mechanism, and one which does not require disassembly for cleaning, as is the case with nozzles, no matter how dirty the water used may be, or how much solid material may be suspended in the liquid. In the event that some, or all, of the perforations 128 in the bowl-like members 20 and 21 should become clogged, they can be easily cleaned without disassembling any portion of the mechanism, merely by brushing them out, blowing them out with an air blast, or flushing them out with a stream of water. Even if all of the perforations in the bowl wall should be stopped up, the liquid forms a thin film on the wall and as this film reaches the rim of the bowl-like member it is sheared off in the form of droplets which are entrained in the swirling air blast from the fan to produce a spray.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. In an orchard spray mechanism,
   (*a*) a supporting vehicle for travel along a path between rows of trees in an orchard,
   (*b*) an upwardly inclined fan shaft journaled on the vehicle to rotate about an axis substantially at right angles to the path of vehicle travel,
   (*c*) power drive means on the vehicle for rotating the fan shaft at high speed,
   (*d*) a fan secured co-axially to the upper end of the fan shaft,
   (*e*) a perforated, bowl-shaped member mounted co-axially on the upper, discharge side of the fan for rotation therewith,
   (*f*) an insecticide liquid supply pipe mounted with a discharge end thereof directed into the bowl-shaped member
   (*g*) and means for supplying liqnid insecticide at low pressure to the liquid supply pipe for discharge into the bowl-like member while the fan and bowl-like member are being rotated at high speed by the fan drive shaft in a direction to discharge a high velocity air blast upwardly and outwardly from the fan, whereby the liquid is discharged by centrifugal force through perforations in the bowl-like member in the form of droplets, which are entrained in the form of spray in the air blast from the fan.

2. In an orchard spray mechanism,
   (*a*) a supporting vehicle for travel along a path between rows of trees in an orchard,
   (*b*) an upwardly inclined fan shaft journaled on the vehicle to rotate about an axis substantially at right angles to the path of vehicle travel,
   (*c*) power drive means on the vehicle for rotating the fan shaft at high speed,
   (*d*) a fan secured co-axially to the upper end of the fan shaft,
   (*e*) bowl-shaped member having a closed bottom and a peripheral wall mounted on the upper, discharge side of the fan for rotation therewith,
   (*f*) the wall portion of the bowl having a plurality of perforations therein spaced upwardly from the bottom of the bowl shaped member, (g) the latter being mounted with its open side directed upwardly and outwardly, (h) an insecticide liquid supply pipe mounted with a discharge end thereof directed into the bowl-shaped member (i) and means for supplying liquid insecticide at low pressure to the liquid supply pipe for discharge into the bowl-like member while the fan and bowl-like member are being rotated at high speed by the fan drive shaft in a direction to discharge a high velocity air blast upwardly and outwardly from the fan, whereby the liquid is discharged by centrifugal force through perforations in the bowl-like member in the form of droplets, which are entrained in the form of spray in the air blast from the fan.

3. In an orchard spray mechanism, (a) a supporting vehicle for travel along a path between rows of trees in an orchard, (b) an upwardly and laterally outwardly inclined fan shaft journaled on the vehicle to rotate about an axis substantially at right angles to the path of vehicle travel, (c) power drive means on the vehicle for rotating the fan shaft at high speed, (d) a fan secured co-axially to the upper end of the fan shaft, (e) a liquid dispensing member with a perforated, peripheral wall mounted on the upper, discharge side of the fan for rotation therewith, (f) an insecticide liquid supply pipe mounted with a discharge end thereof directed into the liquid dispensing member (g) and means for supplying liquid insecticide at low pressure to the liquid supply pipe for discharge into the liquid dispensing member while the fan is being rotated at high speed by the fan drive shaft in a direction to discharge a high velocity air blast upwardly and outwardly from the fan, whereby the liquid is discharged by centrifugal force through perforations in the perforated wall in the form of droplets, which are entrained in the form of spray in the air blast from the fan.

4. In an orchard spray mechanism, (a) a supporting vehicle for travel along a path between rows of trees in an orchard, (b) an upwardly and laterally outwardly inclined fan shaft journaled on the vehicle, (c) an axial flow fan mounted on the upper, outer end of the fan shaft, (d) power drive means for rotating the fan shaft at high speed in a direction to create an upwardly and outwardly directed air blast by the fan, (e) a bowl-shaped member having a closed bottom and a peripheral wall mounted on the upper, discharge side of the fan for rotation therewith, (f) the bowl shaped member being mounted with its open side directed upwardly and outwardly, (g) an insecticide liquid supply pipe mounted with a discharge end thereof directed into the bowl-shaped member (h) and means for supplying liquid insecticide at low pressure to the liquid supply pipe for discharge into the bowl-like member while the fan and bowl-like member are being rotated at high speed by the fan drive shaft in a direction to discharge a high velocity air blast upwardly and outwardly from the fan, whereby the liquid is discharged by centrifugal force from the bowl-like member in the form of droplets, which are entrained in the form of spray in the air blast from the fan.

5. In an orchard spray mechanism, (a) a supporting vehicle for travel along a path between rows of trees in an orchard, (b) a fan support mounted for lateral rocking movement on the vehicle, (c) a pair of angularly diverging fan shafts journaled on the fan support, (d) each fan shaft inclined laterally upwardly and outwardly relative to a fore-and-aft line of the vehicle, (e) an axial flow fan mounted on the upper, outer end of each fan shaft, (f) power drive means for rotating the fan shafts at high speed in a direction to create an upwardly and outwardly directed air blast by each fan, while simultaneously rocking the fan support laterally, (g) a bowl-shaped member having a closed bottom and a peripheral wall mounted on the upper, discharge side of each fan for rotation therewith, (h) each bowl shaped member being mounted with its open side directed upwardly and outwardly, (i) an insecticide liquid supply pipe mounted with a discharge end thereof directed into each bowl-shaped member (j) and means for supplying liquid insecticide at controlled low pressure to each liquid supply pipe for discharge into its bowl-like member while the fans and bowl-like members are being rotated at high speed in a direction to discharge a high velocity air blast upwardly and outwardly from each fan, whereby the liquid is discharged by centrifugal force from each bowl-like member in the form of droplets, which are entrained in the form of spray in the air blasts from their respective fans, and the lateral rocking of the fan support tilts the air blasts up and down in recurring cycles.

6. In an orchard spray mechanism, (a) a supporting vehicle for travel along a path between rows of trees in an orchard, (b) a liquid supply tank mounted medially of the length of the vehicle, (c) an engine at one end of the vehicle, (d) a fan support gear box on the other end of the vehicle, (e) a drive shaft extending through the tank and operatively connected to the engine and journaled in the gear box, (f) a pair of angularly diverging fan shafts journaled on the fan support gear box, (g) each fan shaft inclined laterally upwardly and outwardly relative to a fore-and-aft line of the vehicle, (h) an axial flow fan mounted on the upper, outer end of each fan shaft, (i) gearing in the gear box operatively interconnecting the drive shaft and the fan shafts in a direction to create an upwardly and outwardly directed air blast by each fan, (j) a bowl-shaped member mounted on the upper, discharge side of each fan for rotation therewith, (k) an insecticide liquid supply line communicating from the liquid supply tank into each bowl-shaped member (l) and pump means for pumping liquid insecticide at controlled low pressure from the tank through each liquid supply pipe for discharge into its bowl-like member while the fans and bowl-like members are being rotated by the engine at high speed in a direction to discharge a high velocity air blast upwardly and outwardly from each fan.

whereby liquid is discharged by centrifugal force from each bowl-like member in the form of droplets, which are entrained in the form of spray in the air blasts from their respective fans.

7. In an orchard spray mechanism, (a) a supporting vehicle for travel along a path between rows of trees in an orchard.

(b) a liquid supply tank mounted medially of the length of the vehicle, (c) an engine at one end of the vehicle, (d) a gear box on the other end of the vehicle,
(e) a drive shaft extending through the tank and operatively connected to the engine and journaled in the gear box,
(f) a support on the trailer providing journal support for the drive shaft adjacent the gear box,
(g) a pair of angularly diverging fan shafts journaled on the gear box,
(h) an axial flow fan mounted on the upper, outer end of each fan shaft,
(i) gearing in the gear box operatively interconnecting the drive shaft and the fan shafts in a direction to create an upwardly and outwardly directed air blast by each fan,
(j) rocking means operatively interconnecting the gear box to a vehicle element for rocking the gear box back and forth about the drive shaft upon rotation of the latter,
(k) a bowl-shaped member mounted on the upper, discharge side of each fan for rotation therewith,
(l) an insecticide liquid supply line communicating from the liquid supply tank into each bowl-shaped member
(m) and pump means for pumping liquid insecticide at controlled low pressure from the tank through each liquid supply pipe for discharge into its bowl-like member while the fans and bowl-like members are being rotated by the engine at high speed in a direction to discharge a high velocity air blast upwardly and outwardly from each fan and the gear box and fans are rocking back and forth in recurring cycles.

8. An arrangement according to claim 7 wherein the rocking means includes a roller arm rotatively driven at slow speed from the gearing, a roller mounted on the outer end of the arm, and a channel secured to the vehicle and mounted to restrain the roller therein during rotation of the arm.

References Cited in the file of this patent

UNITED STATES PATENTS

| | | |
|---|---|---|
| 1,582,992 | Loepsinger | May 4, 1926 |
| 1,647,918 | Krender | Nov. 1, 1927 |
| 2,671,690 | Ehrenkrook | Mar. 9, 1954 |
| 2,677,576 | Brann | May, 4, 1954 |
| 2,768,859 | Patterson | Oct. 30, 1956 |
| 2,888,206 | Waldrum | May 26, 1959 |